United States Patent
Matsumoto et al.

(10) Patent No.: US 7,304,921 B2
(45) Date of Patent: Dec. 4, 2007

(54) RECORDING CONTROL DEVICE, RECORDING CONTROL METHOD, PROGRAM AND RECORDING SYSTEM

(75) Inventors: Kissei Matsumoto, Kanagawa (JP); Takashi Fukushima, Tokyo (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 11/155,873

(22) Filed: Jun. 17, 2005

(65) Prior Publication Data
US 2005/0281158 A1    Dec. 22, 2005

(30) Foreign Application Priority Data
Jun. 18, 2004    (JP) .......................... P2004-180831

(51) Int. Cl.
*G11B 5/09*    (2006.01)
(52) U.S. Cl. ................ 369/47.14; 369/53.15; 369/53.17; 360/53
(58) Field of Classification Search ............... None
See application file for complete search history.

(56) References Cited

U.S. PATENT DOCUMENTS

| | | | | |
|---|---|---|---|---|
| 5,532,992 | A | * | 7/1996 | Funamoto ............. 369/47.14 |
| 6,078,452 | A | * | 6/2000 | Kittilson et al. ............. 360/51 |
| 6,742,147 | B1 | * | 5/2004 | Sasaki et al. ............. 714/710 |
| 6,922,801 | B2 | * | 7/2005 | Archibald et al. ........... 714/723 |
| 6,973,014 | B1 | * | 12/2005 | Ihde ........................ 369/30.21 |
| 7,016,276 | B2 | * | 3/2006 | Gotoh et al. ............. 369/47.14 |

FOREIGN PATENT DOCUMENTS

| | | |
|---|---|---|
| JP | 61-096572 | 5/1986 |
| JP | 06-036474 | 2/1994 |
| JP | 2000-113563 | 4/2000 |
| JP | 2003-296903 | 10/2003 |
| JP | 2003-331523 | 11/2003 |

* cited by examiner

*Primary Examiner*—Andrea Wellington
*Assistant Examiner*—Dismery Mercedes
(74) *Attorney, Agent, or Firm*—Wolf, Greenfield & Sacks, P.C.

(57) ABSTRACT

To provide a recording control device able to control a data recording so as not to use a defective sector free from a sector test before a shipment thereof, which controls a data recording with respect to a plurality of sectors in a recording region of a recording medium and has: a verification unit writing data to be written to a first sector in the recording medium when receiving a write request to the recording medium, then reading out the data from the first sector, and performing a verification processing comparing the data to be written with the read out data; and a processing unit writing the data to be written to a second sector on condition that the verification unit decides that the comparison result is disagreement, and determining attribute data as a management data.

2 Claims, 5 Drawing Sheets

| SECTOR ID | ATTRIBUTE DATA | |
|---|---|---|
| ... | NS/DS/UVS | |
| ... | NS/DS/UVS | |
| ... | NS/DS/UVS | |

SMD

FUNCTION BLOCK OF CPU 66

RECORDING CONTROL DEVICE, RECORDING CONTROL METHOD, PROGRAM AND RECORDING SYSTEM

CROSS REFERENCES TO RERATED APPLICATIONS

The present invention contains subject matter related to Japanese Patent Application JP 2004-180831 filed in the Japanese Patent Office on Jun. 18, 2004, the entire contents of which being incorporated herein by reference.

BACKGROUND OF THE INVENTION

1. Field of the Invention

The present invention relates to a recording control device with a recoding medium in which a recoding region is divided into a plurality of sectors, a recording control method, a program and a recoding system.

2. Description of the Related Art

A hard disk drive (HDD) divides a recoding region of a magnetic disk into a plurality of sectors and records data on each of the sectors as a unit.

A sector may become a defective recoding in producing the HDD, so that the sector is tested in order not to make a defective sector use after a shipment.

The above test is performed by using a test apparatus, and the entire sector in the recording region of the magnetic disk is tested with its quality, namely defective or non-defective.

Further, the HDD stores a read out error frequency of a sector to be read out when reading out data after the shipment. If the error frequency exceeds a predetermined reference, the sector may be recorded as a defective sector and the defective sector may not be used.

On the other hand, when recording data, the HDD selects a sector which is not recorded as the defective sector and writes data to the sector.

SUMMARY OF THE INVENTION

However, the above HDD performs the test to the sector of the magnetic disk before the shipment, so that the test apparatus has been demanded.

Further, the entire sector of the magnetic disk is tested before a shipment, so that a long time has been demanded for producing.

Due to this, a cost reduction of the HDD has been restricted.

Other recording systems in which a recording region of a recording medium is divided into a plurality of sectors and controlled so as not to use a defective sector have a similar disadvantage.

The present invention is to provide a recording control device able to control a data recording with respect to a plurality of sectors determined at a recording region of a recording medium so as not to use a defective sector free from a sector test before the shipment, a recording control method, a program and a recording system for the same.

According to an embodiment of the present invention, there is provided a recording control device controlling a data recording with respect to a plurality of sectors in a recording region of a recording medium, the recording control device including a verification means for writing data to be written to a first sector in the recording medium when receiving a write request to the recording medium, then reading out the data from the first sector, and performing a verification process comparing the data to be written with the read out data, and a processing means for writing the data to be written to a second sector other than the first sector on condition that the verification means decides that the comparison result is disagreement, and setting attribute data indicating that the first sector is a defective sector to a management data.

According to an embodiment of the present invention, there is provided a recording control method controlling a data recording with respect to a plurality of sectors in a recording region of a recording medium, the recording control method including a first step of writing data to be written to a first sector in the recording medium when receiving a recording request to the recording medium, then reading out the data from the first sector; a second step of comparing the data written to the first sector in the first step with the data read out in the first step; and a third step of writing the data to be written to a second sector other than the first sector on condition that the comparison result is disagreement in the second step, and setting attribute data indicating that the first sector is a defective sector to a management data.

According to an embodiment of the present invention, there is provided a program to be executed by a computer with a control of a data recording with respect to a plurality of sectors in a recording region of a recording medium, the program including a first routine for writing data to be written to a first sector in the recording medium when receiving a recording request to the recording medium, then reading out the data from the first sector; a second routine for comparing the data written to the first sector in the first routine with the data read out in the first routine; and a third routine for writing the data to be written to a second sector other then the first sector on condition that the comparison result is disagreement in the second routine, and setting attribute data indicating that the first sector is a defective sector to a management data.

According to an embodiment of the present invention, there is provided a recording system having a recording device and a recording control device, wherein the recording device includes a recording medium having a recording region divided into a plurality of sectors, and a head accessing a determined sector of the recording medium and performing a writing operation or a read out operation with respect to the sector, and the recording control device includes a verification means for outputting data to be written to the recording device when receiving a write request to the recording medium, writing the data to a first sector in the recording medium then controlling the recording device so as to read out the data from the first sector, and performing a verification processing comparing the data to be written with the read out data, and a processing means for controlling the recording device so as to write the data to be written to a second sector other than the first sector on condition that the verification means decides that the comparison result is disagreement, and setting attribute data indicating that the first sector is a defective sector to a management data.

According to an embodiment of the present invention, there is provided a recording control device controlling a data recording with respect to a plurality of sectors in a recording region of a recording medium, the recording control device including a verification circuit writing data to be written to a first sector in the recording medium when receiving a write request to the recording medium, then reading out the data from the first sector, and performing a verification process comparing the data to be written with the read out data, and a processing circuit writing the data to be written to a second sector other than the first sector on condition that the verification circuit decides that the comparison result is disagreement, and setting attribute data indicating that the first sector is a defective sector to a management data.

According to a recording control device, a recording control method, a program and a recording system of embodiments of the present invention, it is able to control the data recording with respect to a plurality of sectors in a recording region of a recording medium so as not to use a defective sector free from a sector test before the shipment.

BRIEF DESCRIPTION OF THE DRAWINGS

These features of embodiments of the present invention will be described in more detail with reference to the accompanying drawings, in which.

DESCRIPTION OF THE PREFERRED EMBODIMENTS

Hereinafter, preferred embodiments of the present invention will be explained with reference to the drawings.

First Embodiment

A first embodiment will be explained with reference to FIGS. 1 to 5.

Figure 1:
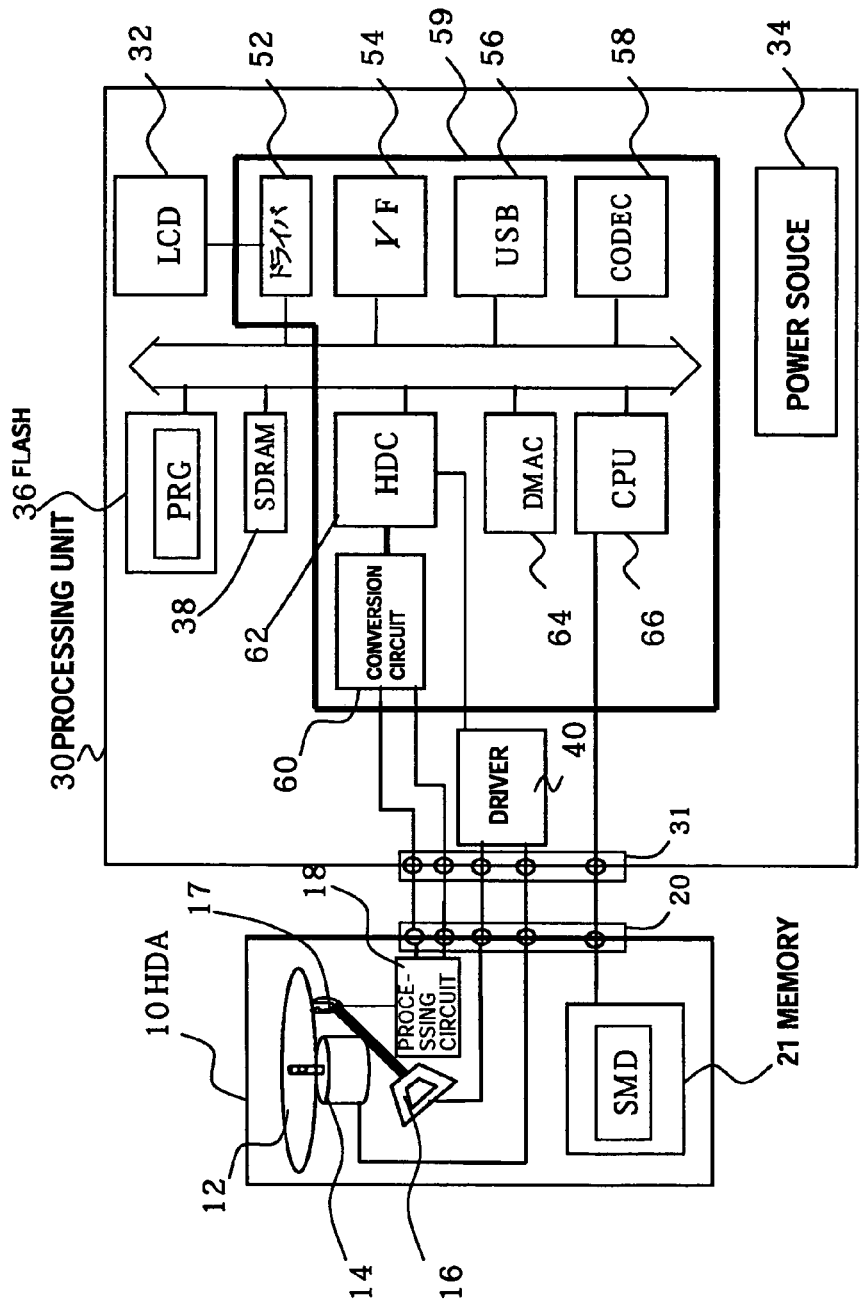
FIG. 1 is a view of the entire configuration of an audio system according to a first embodiment of the present invention.

FIG. 1 is a view of the entire configuration of an audio system according to the first embodiment of the present invention As shown in FIG. 1, the audio system 1 has a hard disk assembly (HDA) 1 and a processing unit 30, for example.

The audio system 1 is a portable type, and is set to a system for recording audio data and reproducing the same.

In the audio system 1, the processing unit 30 performs a write operation to a sector of a magnetic disk 12 after a shipment and verifies a defective or non-defective of the sector, namely quality of the sector. Therefore, the magnetic disk 12 does not have to be tested with the quality of the sector in producing the HDA 10.

Next, the HDA 10 and the processing unit 30 shown in FIG. 1 will be explained.

(HDA 10)

As shown in FIG. 1, the HDA 10 has the magnetic disk 12, a spindle motor 14, a voice coil motor (VCM) 16, a head 17, a processing circuit 18, an interface 20 and a memory 21, for example.

The HDA 10 has a closed structure in order to prevent an inflow of fine particles from the outside.

The magnetic disk 12 has a recording region divided into a plurality of sectors concentrically and circularly.

The spindle motor 14 rotates the magnetic disk 12.

The VCM 16 makes a current flow from a driver 40 of the processing unit 30 to a coil to move the head 17 in a radial direction of the magnetic disk 12 by an electromagnetic induction. Due to this, the head 17 is moved to an access position on the magnetic disk 12.

The head 17 is adjoined and placed to the recording region on the magnetic disk 12, and performs a write operation of an audio signal with respect to the sector and a read out operation of the audio signal from the sector.

The processing circuit 18 amplifies the audio signal read out from the magnetic disk 12 by the head 17, and outputs it via the interface 20 to the processing unit 30.

Further, the processing circuit 18 outputs the audio signal to be written input from the processing unit 30 to the head 17.

The memory 21 is used with an electrically erasable programmable read only memory (EEPROM). Note that, the memory 21 may be a flash memory.

The memory 21 is written with a sector management data SMD by the processing unit 30.

Note that, the sector management data SMD may be stored on a region which is the outside of a management region on the magnetic disk 12, namely on a SMART region where a vendor records hiddenly. If recording the sector management data SMD on the magnetic disk 12, for example, the sector management data SMD is read out from the magnetic disk 12 to a synchronous dynamic random access memory (SDRAM) 38 in starting the audio system 1, and applied by an access of the CPU 66 to the SDRAM 38.

Figures 2, 3:
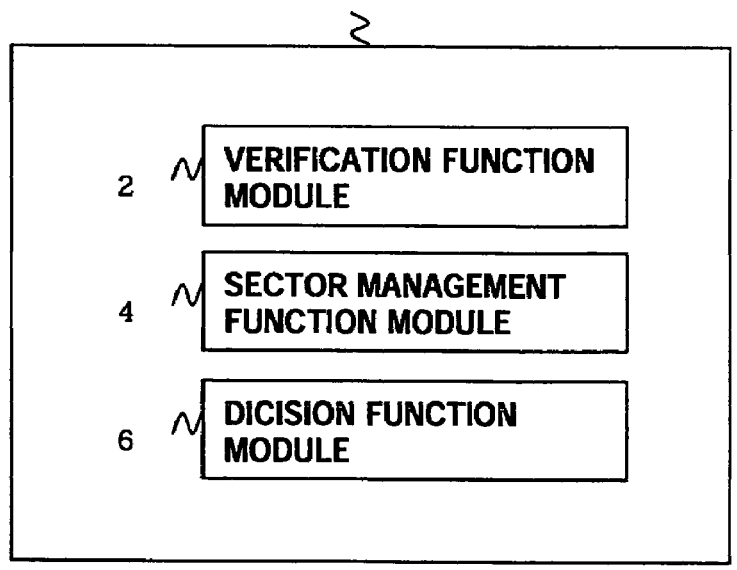
FIG. 2 is a view for illustrating a sector management data (SMD) shown in FIG. 1.
FIG. 3 is a view for illustrating an operation module of a central processing unit (CPU) shown in FIG. 1.

FIG. 2 is a view for illustrating the sector management data SMD.

As shown in FIG. 2, the sector management data SMD indicates attribute data of each of the sectors in the recording region of the magnetic disk 12.

The attribute data indicates that the sector is some of a recordable non-defective sector NS, a defective sector DS of a defective-recording and an unverified sector UVS.

In the present embodiment, that whether each of sector is either of the non-defective sector NS and the defective sector DS is verified when writing the audio data to the sector in the processing unit 30 after the shipment of the audio system 1.

(Processing Unit 30)

As shown in FIG. 1, the processing unit 30 has a HDA interface 31, a liquid crystal display 32, a power source circuit 34, a flash memory 36, the SDRAM 38, a driver 40, a liquid crystal driver 52, an interface 54, a universal serial bus (USB) interface 56, a codec 58, a conversion circuit 60, a hard disk controller (HDC) 62, a direct memory access controller (DMAC) 64 and the CPU 66, for example.

In the present embodiment, the liquid crystal driver 52, the interface 54, the USB interface 65, the codec 58, the conversion circuit 60, the HDC 62, the DMAC 64 and the CPU 66 are integrally formed by a semiconductor integrated circuit 59.

The HDA interface 31 is connected to the interface 20 of the HDA 10, and inputs and outputs data to the HDA 10.

The liquid crystal display 32 displays an image to a screen in accordance with a control from the liquid crystal driver 52. The screen is an operation screen for example.

The power source circuit 34 provides the respective components of the processing unit 30 with a drive electrical power.

The flash memory 36 stores a program PRG which determines a processing of the CPU 66. The program PRG is a firm ware F/W.

The SDRAM 38 stores data concerning a processing of the processing unit 30.

The driver 40 outputs a control signal to the spindle motor 14 and the VCM 16 of the HDA 10 according to a control from the HDC 62.

The liquid crystal driver 52 controls a display of the liquid crystal display 32 on the basis of a control signal from the CPU 66.

The interface 54 and the USB interface 56 input and output data to the outside of the processing unit 30.

The codec 58 decodes the audio data read out from the HDA 10, and encodes the audio data to be written in the HDA 10.

The conversion circuit 60 performs a filter processing (an equalizer processing) and an A/D conversion of the audio signal read out from the HDA 10, and outputs the audio data obtained by the processing to the HDC 62. Namely, the conversion circuit 60 has a function of so-called a "read channel".

Further, the conversion circuit 60 performs a D/A conversion of the audio data to be written input from the HDC 62 to generate an audio signal, and outputs it to the HDA 10.

The HDC 62 controls collectively accesses to the HDA 10 according to a control from the CPU 66.

The CPU 66 controls collectively operations of the processing unit 30.

The CPU 66 performs a control and a processing, for example a write operation and a read out operation in explanation blow, according to the program PRG which is read out from the flash memory 36.

The CPU 66 executes the program PRG to realize a verification function module 2, a sector management function module 4 and a decision function module 6 shown in FIG. 3, for example.

The CPU 66 may include a plurality of circuits.

A processing of the CPU 66 will be explained with reference to the following example of an operation of the processing unit 30.

Next, an example of the operation of the processing unit 30 will be explained.

(Example of Write Operation)

An example of an operation in which the processing unit 30 writes the audio data to the HDA 10 will be explained.

Figure 4:
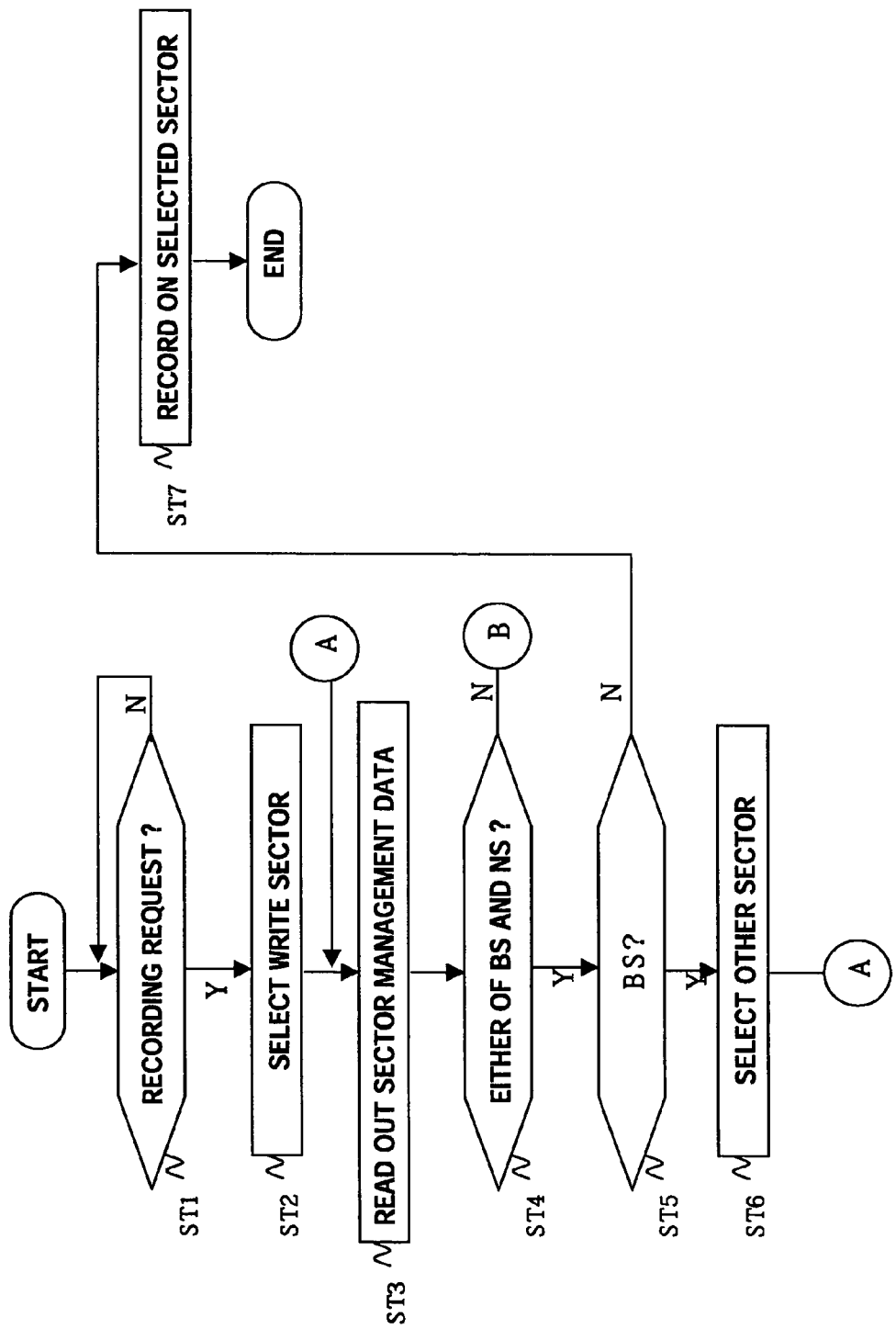
FIG. 4 is a flow chart for illustrating an example of an operation when a processing unit writes audio data with respect to a HDA shown in FIG. 1.
Figure 5:
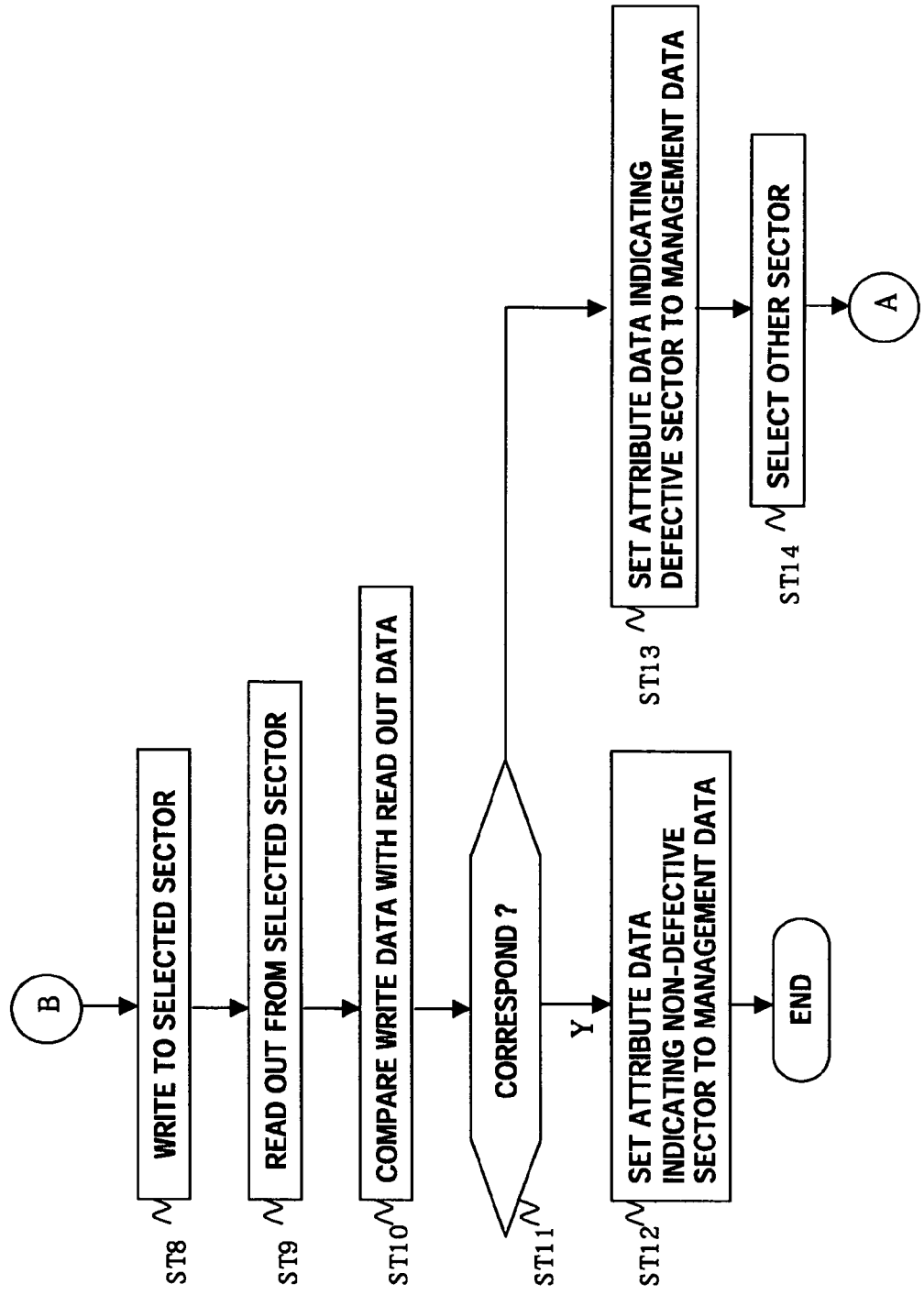
FIG. 5 is a following flow chart of FIG. 4 for illustrating an example of an operation when a processing unit writes audio data with respect to a HDA shown in FIG. 1.

FIGS. 4 and 5 are flow charts for illustrating the example of the operation in which the processing unit 30 writes the audio data to the HDA 10.

In FIGS. 4 and 5, steps ST8 to ST12 are executed by the verification function module 2 shown in FIG. 3.

Further, steps ST7, ST13 and ST14 are executed by the sector management function module 4 shown in FIG. 3.

Furthermore, steps ST1 to ST6 are executed by the decision function module 6 shown in FIG. 3.

Step ST1:

The CPU 66 decides whether a recording request of the audio data is input.

The recording request is input to the CPU 66 in accordance with an operation of a not shown operation unit from a user.

Step ST2:

The CPU 66 selects a sector to be written in a plurality of sectors in the recording region of the magnetic disk 12.

At that time, the CPU 66 selects the sector according to the predetermined algorithm.

Step ST3:

The CPU 66 reads out the sector management data SMD shown in FIG. 2 via the HDA interface 31 from the memory 21 of the HDA 10.

Step ST4:

The CPU 66 obtains the attribute data corresponding to an identification data ID of the sector selected in step ST2 from the sector management data SMD read out in step ST3.

Then, the CPU 66 decides whether the obtained attribute data indicates either of the defective sector DS and the non-defective sector NS. If deciding it, the routine proceeds to step ST5. If not, the routine proceeds to step ST8 shown in FIG. 5.

Step ST5:

The CPU 66 decides whether the attribute data obtained in step ST4 indicates the defective sector DS. If deciding it, the routine proceeds to step ST6. If not, the routine proceeds to step ST7.

Step ST6:

The CPU 66 selects a sector other than the sector selected in step ST2 as a write sector, and then returns to step ST3.

Step ST7:

The CPU 66 writes the audio data to be written to the sector selected in step ST2.

Concretely, the CPU 66 controls the HDC 62 so as to write the audio data encoded by the codec 58 to the sector.

The HDC 62 outputs the encoded audio data to the conversion circuit 60 on the basis of the control from the CPU 66.

Further, the HDC 62 controls the VCM 16 via the driver 40 so as to place the head 17 in the selected sector on the magnetic disk 12.

The conversion circuit 60 performs the D/A conversion to the audio data input from the HDC 62 to generate the audio signal, and output the generated signal to the processing circuit 18 of the HDA 10. The processing circuit 18 writes the audio signal via the head 17 to the selected sector of the magnetic disk 12.

Step ST8:

Step ST8 is the same as step ST7.

Step ST9:

The CPU 66 reads out the audio data from the selected sector, namely the written sector in step ST8.

Concretely, the CPU 66 controls the HDC 62. Consequently the audio signal is read out from the sector by the head 17, amplified by the processing circuit 18, and output to the conversion circuit 60.

The conversion circuit 60 performs the A/D conversion of the input audio signal to generate the audio data, and outputs it to the HDC 62.

Then, the HDC 62 outputs the generated audio data to the codec 58, and the codec 58 decodes the audio data.

Step ST10:

The CPU 66 compares the audio data written in step ST8 which is not encoded and the audio data decoded in step ST9.

Step ST11:

If the CPU 66 decides that the both are corresponded in the above comparison in step ST10, the routine proceeds to step ST12. If it decides that the both are not, the routine proceeds to step ST13.

Step ST12:

The CPU 66 sets the attribute data indicating the non-defective sector corresponding to the selected sector to the sector management data SMD shown in FIG. 2.

Step ST13:

The CPU 66 sets the attribute data indicating the defective sector corresponding to the selected sector to the sector management data SMD shown in FIG. 2.

Step ST14:

The CPU 66 selects a sector other than the sector selected in step ST2 as a write sector, and then returns to step ST3 shown in FIG. 4.

(Read Out Operation)

The CPU 66 receives a read out (reproduction) request in accordance with an operation from a user, and then outputs the designed request of the sector according to the read out request to the driver 40.

The driver 40 controls the VCM 16 of the HDA 10 to make the head 17 move to a position in the sector according to the read out request.

Then, the head 17 reads out the audio signal from the sector, and then the processing circuit 18 amplifies the audio signal and outputs it to the conversion circuit 60.

The conversion circuit 60 performs the A/D conversion of the audio signal to generate the audio data, and outputs it to the HDC 62.

The HDC 62 performs an error collection code (ECC) processing to the audio data input from the conversion circuit 60, and outputs the result to the codec 58.

The codec 58 decodes the audio data input from the HDC 62, and outputs the result to the CPU 66.

The CPU 66 performs a voice output processing of the audio data input from the codec 58.

Due to this, a voice corresponding to the decoded audio data is output by a not shown speaker.

The CPU 66 performs the read out operation again if an error occurs in reading out the sector according to the read out request by the head 17. Further, the CPU 66 sets the attribute data of the sector in the sector management data SMD shown in FIG. 2 to the defective sector if the error frequency in reading exceeds the predetermined reference.

As mentioned by using FIGS. 4 and 5, when the processing unit 30 performs the write operation to the sector of the magnetic disk 12 after a shipment of the audio system 1, the audio system 1 verifies a quality of the sector. Therefore, the magnetic disk 12 does not have to be tested with the quality of the sector in producing the HDA 10.

Due to this, the test apparatus for testing the quality of the sector becomes unnecessary and test time before the shipment of the audio system 1 can be reduced. Therefore, the audio system 1 can be produced in low cost.

Further, according to the audio system 1, the sector management data SMD is written to a memory 21 of the HDA 10, so that the other processing unit could utilize the sector management SMD if the HDA 10 is connected to the other processing unit.

Note that, when data is not recorded on the magnetic disk 12, namely the magnetic disk 12 is new, the audio system 1 has to perform the verification processing whenever the sector is written. However, the audio data is generally compressed, so that a processing time becomes in the permissive range.

Second Embodiment

The above embodiment is illustrated with the case that the audio system 1 is divided into the HDA 10 and the processing unit 30 and inputs and outputs data via the interface 20 and the HDA interface 31 between the HDA 10 and the processing unit 30.

In the present embodiment, the HDA 10 and the processing unit 30 are formed integrally.

Figure 6:
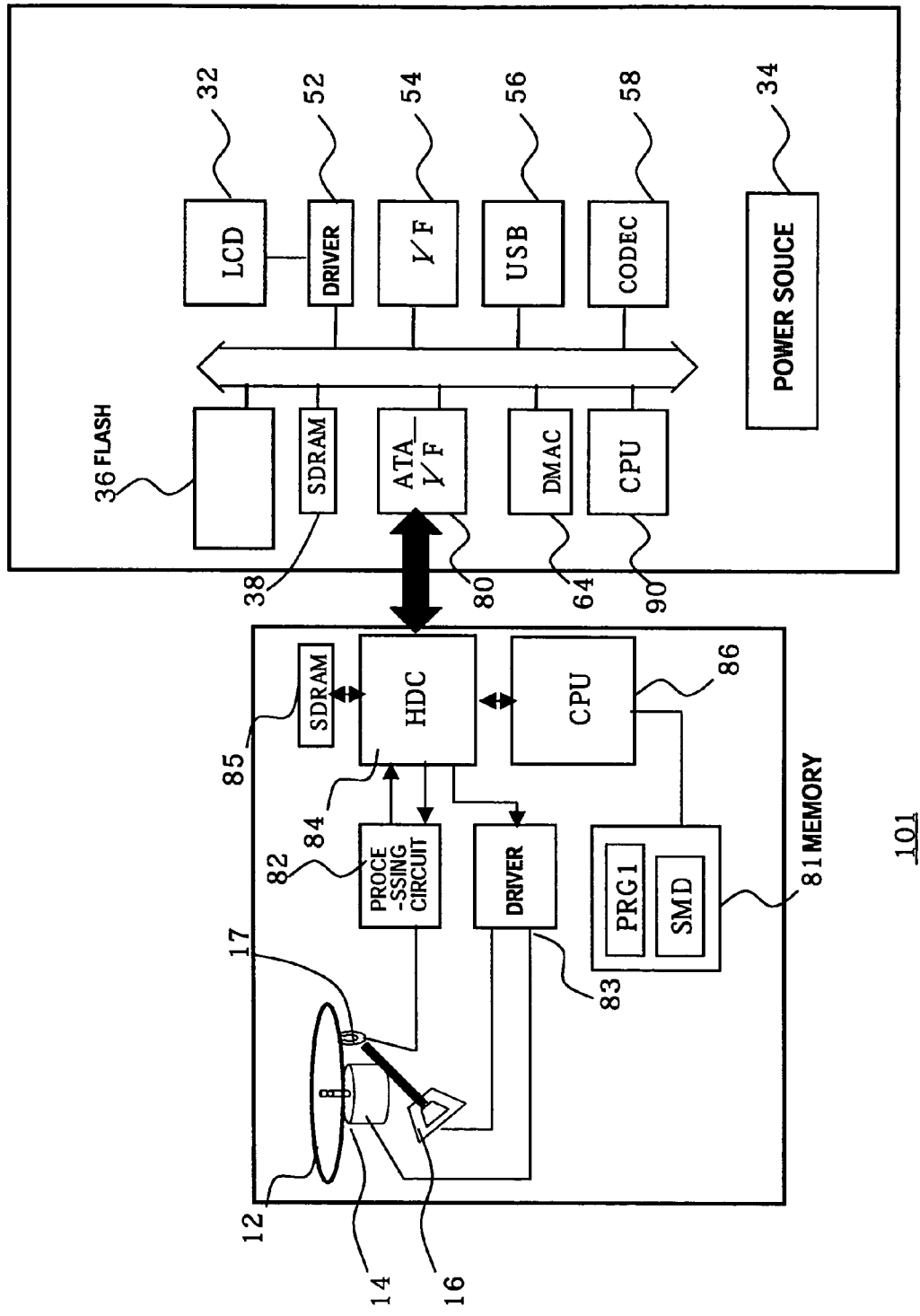
FIG. 6 is a view of the entire configuration of an audio system according to a second embodiment of the present invention.

FIG. 6 shows a view of a configuration of an audio system 101 according to the present embodiment.

As shown in FIG. 6, the audio system 101 has the magnetic disk 12, the spindle motor 14, the VCM 16, the head 17, a memory 81, a processing circuit 82, a driver circuit 83, a HDC 84, a CPU 86, the liquid crystal display 32, the power source 34, the flash memory 36, the SDRAM 38, the driver 40, the liquid crystal driver 52, the interface 54, the USB interface 56, the codec 58, the DMAC 64, an ATA interface 80 and a CPU 90, for example.

In FIG. 6, a component assigned same notation to FIG. 1 is same as the first embodiment.

In the audio system 101, the CPU 90 communicates with the HDC 84 via the interface 80.

The CPU 90 controls a processing of the codec 58 and the liquid crystal display 32, namely the concrete processing accompanying an access with respect to the magnetic disk 12 is controlled by the HDC 84 and the CPU 86.

In the present embodiment, the write operation with respect to the magnetic disk 12 illustrated in FIGS. 4 and 5 is executed by the CPU 86 according to the program PRG1 stored in the memory 81.

Further, the sector management data SMD mentioned in the first embodiment is stored in the memory 81. Further the memory 81 stores a variation of the magnetic disk 12 or a head 17, a parameter depending on temperature or other data. The CPU 86 controls an access to the magnetic disk 12 on the basis of these data stored in the memory 81.

Note that, the memory 81 is an EEPROM, for example.

The processing circuit 82 performs a processing corresponding to the processing of the processing circuit 18 and the conversion circuit 60 shown in FIG. 1, and the HDC 84 performs a processing corresponding to the HDC 62 shown in FIG. 1.

Similar to the first embodiment illustrated in FIGS. 4 and 5, when the CPU 86 performs the write operation to the sector of the magnetic disk 12 after a shipment of the audio system 101, the audio system 101 verifies the quality of the sector. Therefore, the magnetic disk 12 does not have to be tested with the quality of the sector in producing the audio system 101.

Due to this, the test apparatus for testing the quality of the sector becomes unnecessary, further test time before the shipment of the audio system 101 can be reduced. Therefore, the audio system 101 can be produced in low cost.

The present invention is not limited to the above embodiments.

The above embodiments are illustrated with the case of recording the audio data on the magnetic disk 12, additionally the present invention also can be applied in the case of recording video data or other data on the magnetic disk 12.

Further, the above embodiments are illustrated with the magnetic disk as a recording medium of the present invention, but if the recording medium has a recording region divided into a plurality of sectors, it may not limited to.

Furthermore, in the first embodiment, the processing unit 30 writes the sector management data SMD to the memory 21 of the HDA 10. Additionally, the sector management data SMD may be written to the flash memory 36 in the processing unit 30.

The present invention can be applied to a system recording data on a recording medium in which a recording region is divided into a plurality of sectors.

It should be understood by those skilled in the art that various modifications, combinations, sub-combinations and alterations may occur depending on design requirements and other factors in so far as they are within scope of the appeared claims or the equivalents thereof.

What is claimed is:

1. A recording control device controlling a data recording with respect to a plurality of sectors in a recording region of a recording medium, said recording control device comprising:
   a verification means for writing data to be written to a first sector in the recording medium when receiving a write request to the recording medium, then reading out the data from the first sector, and performing a verification process comparing the data to be written with the read out data, and
   a processing means for writing the data to be written to a second sector other than the first sector on condition that said verification means decides that a comparison result is disagreement, and sending attribute data indicating that the first sector is a defective sector to a management data section, further comprising:
   a decision means for deciding whether the attribute data indicating the existence of either a defective sector or a non-defective sector in the sector selected in the plurality of sectors is sent to the management data section when receiving the write request to the recording medium, wherein
   said verification means performs the verification process by using the selected sector as the first sector on condition that said decision means decides that the attribute data indicating the existence of either a defective sector or a non-defective sector in the selected sector is not sent to the management data.

2. A recording control device as set forth in claim 1, wherein said decision means decides whether the selected sector is the non-defective sector when receiving the write request to the recording medium, and
   said processing means writes the data to be written to the selected sector on condition that said decision means decides that the selected sector is the non-defective sector.

* * * * *